United States Patent
Goden (10) Patent No.: US 6,404,436 B1
(45) Date of Patent: Jun. 11, 2002

(54) IMAGE PROCESSING METHOD, IMAGE PROCESSOR, AND PSEUDO-EXPERIENCE DEVICE

(75) Inventor: Takeshi Goden, Tokyo (JP)

(73) Assignee: Sega Corporation, Tokyo (JP)

( * ) Notice: Subject to any disclaimer, the term of this patent is extended or adjusted under 35 U.S.C. 154(b) by 0 days.

(21) Appl. No.: 08/817,227

(22) PCT Filed: Jun. 27, 1996

(86) PCT No.: PCT/JP96/01784
§ 371 (c)(1),
(2), (4) Date: May 27, 1997

(87) PCT Pub. No.: WO97/08657
PCT Pub. Date: Mar. 6, 1997

(30) Foreign Application Priority Data

Aug. 31, 1995 (JP) ............................................. 7-223788

(51) Int. Cl.[7] ............................................. G06T 15/00
(52) U.S. Cl. ...................................................... 345/473
(58) Field of Search ................................ 345/419, 473, 345/474, 475, 420, 426

(56) References Cited

U.S. PATENT DOCUMENTS 6,275,236 B1 * 8/2001 Delahunty .................. 345/473

FOREIGN PATENT DOCUMENTS

| JP | 6301794 | 10/1994 |
| JP | 7044735 | 2/1995 |

* cited by examiner

Primary Examiner—Phu K. Nguyen
(74) Attorney, Agent, or Firm—Price and Gess (57) ABSTRACT

A system two dimensional image processing comprises an image display 300, a central processing unit 102, memories 103–108, a program processing section 100 which executes a game program which moves a moving object in a virtual three-dimensional space in which three-dimensional objects are arranged, and an operation section 200 which accepts speed data on the moving objects in the virtual three-dimensional space and sends the data to the program processing unit. The operation section 200 sends moving-object speed data to a perspective conversion unit 110. The perspective conversion unit 110 makes the distance between a viewpoint and a projection screen variable according to the relative speed of the moving object. As the effective visual area on the projection screen becomes smaller, the range of the virtual three-dimensional space displayed in the effective visual area becomes larger. This makes the view field angle to the projection screen variable according to the movement speed of the moving object.

16 Claims, 7 Drawing Sheets

IMAGE PROCESSING METHOD, IMAGE PROCESSOR, AND PSEUDO-EXPERIENCE DEVICE

BACKGROUND OF THE INVENTION

1. Field of the Invention

This invention relates to an image processing method and an image processing system which project computer-controlled images on image display means and to an experience simulation system which uses the method and the system.

2. Description of the Prior Art

Simulation systems such as computer-controlled video game systems and experience-simulation systems have been used. In particular, experience-simulation systems for a moving object such as a car or an airplane to move in a three dimensional space and competing in scores and for times or experiencing unusual experiences such as motorcycles games, driving games, flight simulation games and are popular. This type of experience simulation system has a program processing unit which processes programs and data, an image display means such as a CRT or liquid crystal display screen on which computer-generated video is projected, and an operation section which allows the player to control the program processing units. There are many types of operation unit. That is, not only a control panel on which buttons and levers are provided but also the model of a vehicle, such as the body of a motorcycle or the cockpit of a racing car or an airplane, is used depending upon the type or operation of the unit used in the game.

Figure 5:
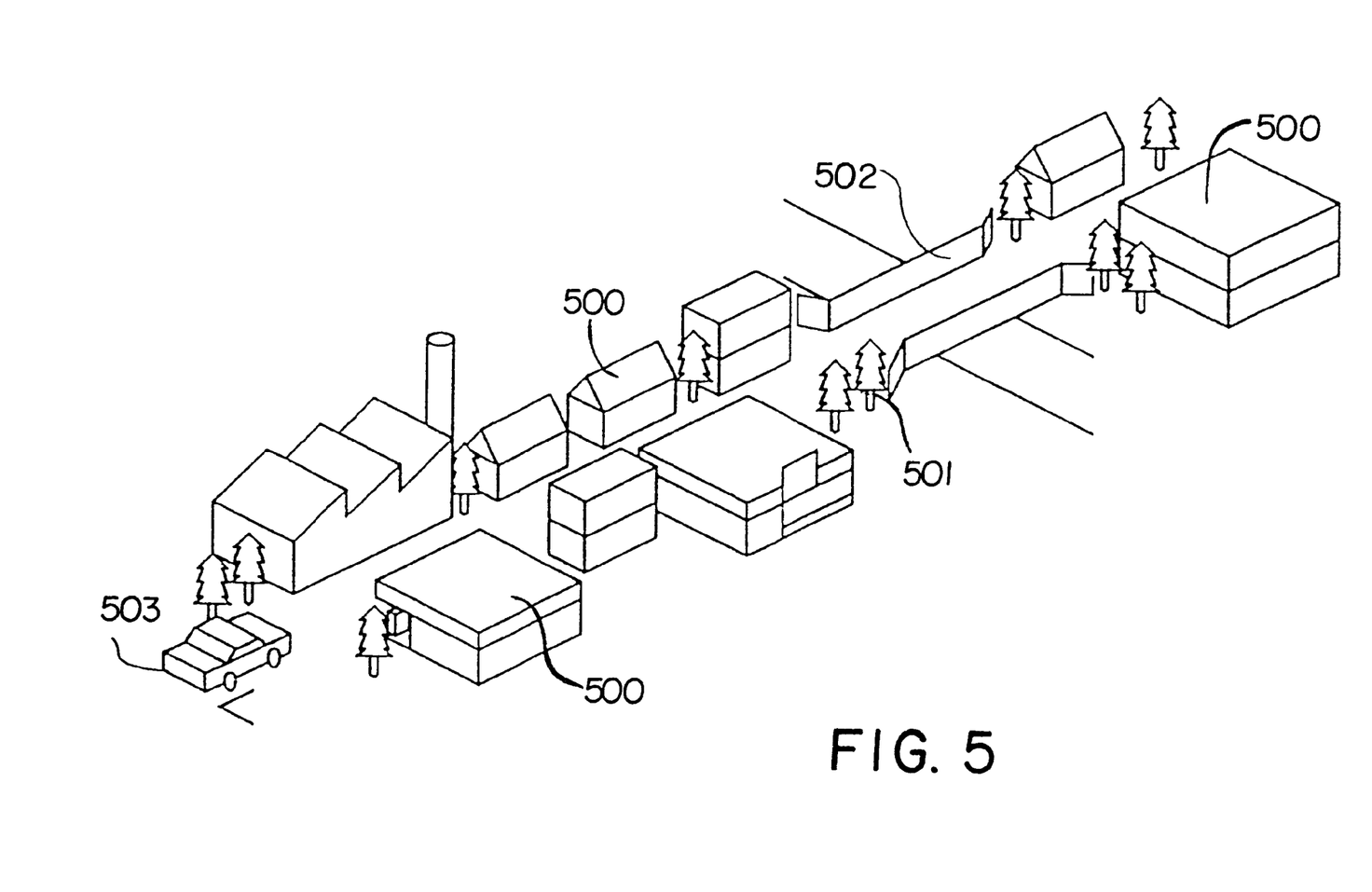
FIG. 5 is a perspective view showing the virtual three-dimensional space of the experience simulation system and an example of the objects contained in the system.

Video images are displayed on the image display means of the experience simulation system. For example, in a driving game, a plurality of previously-stored, three-dimensional objects are arranged in a virtual three-dimensional space called a game field. FIG. 5 is an example of a game field where three-dimensional objects are arranged. Along the driving course are arranged three-dimensional objects such as the building 500, trees 501, guardrail 502, and vehicle 503.

Figure 6:
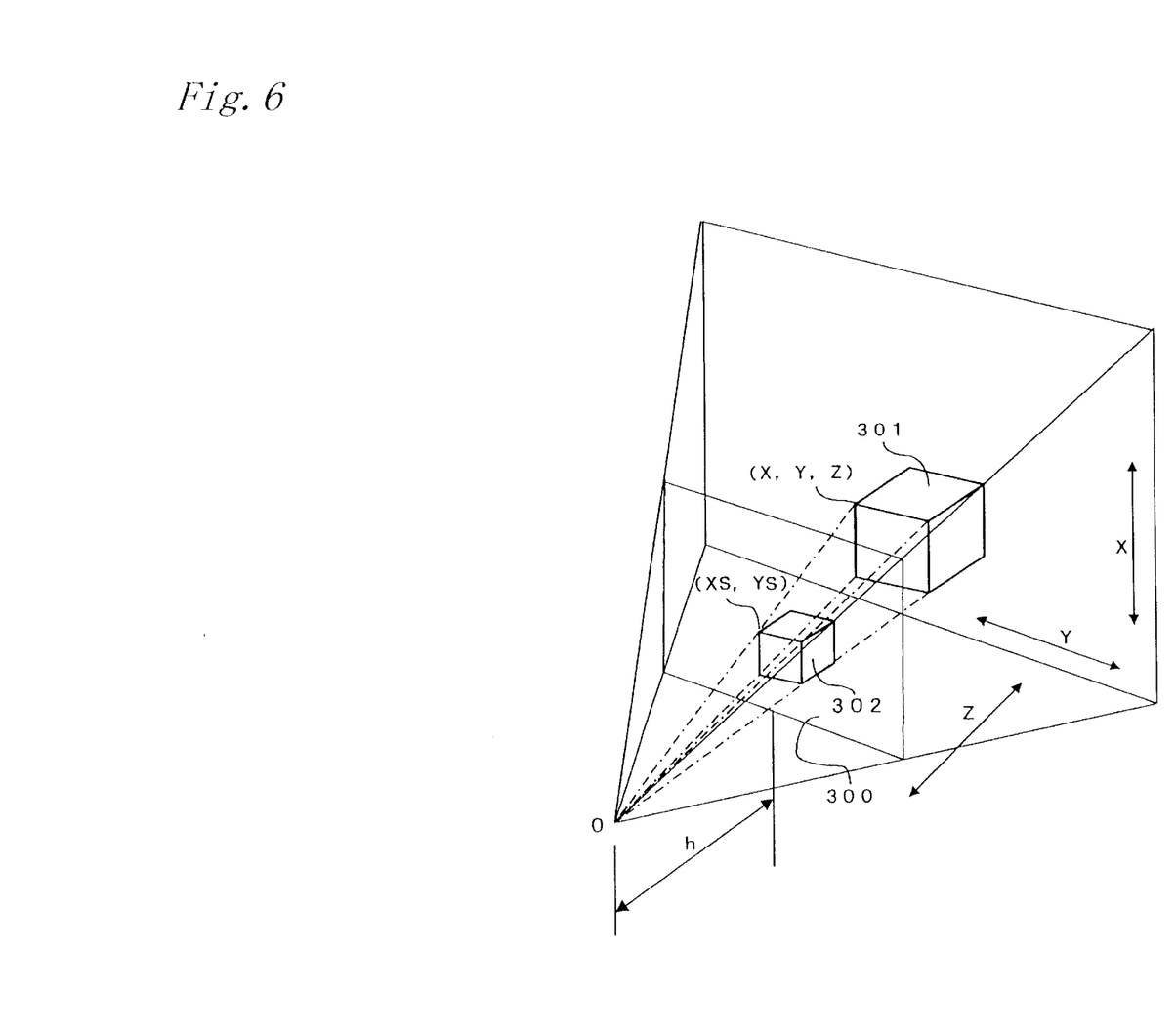
FIG. 6 is a perspective view showing the principle of the perspective conversion unit used in the experience simulation system.

The experience simulation system displays the three-dimensional objects on the image display means as follows: that is, it looks through the virtual three-dimensional space containing the three-dimensional objects from a given viewpoint, projects image information about each object represented as the perspective coordinates onto the projection screen some distance away from the viewpoint, and draws the two-dimensional projection images on the projection screen in the image display means. For example, as shown in FIG. 6, the system looks through the object 301 arranged in the three-dimensional space from the viewpoint 0 and projects it onto the projection screen 300 that is "h" away from the viewpoint 0 in the form of two-dimensional projection image 302. In this case, the system divides the three-dimensional object 301 into a plurality of polygons and, based on the coordinates (X, Y, Z) of the vertexes of each polygon, calculates the coordinates (XS, YS) of each vertex of the image to be displayed on the projection screen, using the formula (1).

$$XS=(X/Z) \times h \quad \text{[Formula 1]}$$
$$YS=(Y/Z) \times h \quad (1)$$

The player controls the operation section of the experience simulation system to drive a motorcycle or a racing car or to pilot an airplane to participate in a race or a combat, and competes for times and scores. In this case, as the moving object moves around in the virtual three-dimensional space, the position of the viewpoint 0, which is relatively associated with the moving object, also moves. That is, as the distance between the viewpoint 0 and each object 301 changes, the shape of the two-dimensional projection image 302 displayed on the image display means 300 also changes, giving the player an illusion that the object moves in the three-dimensional space.

Figure 7:
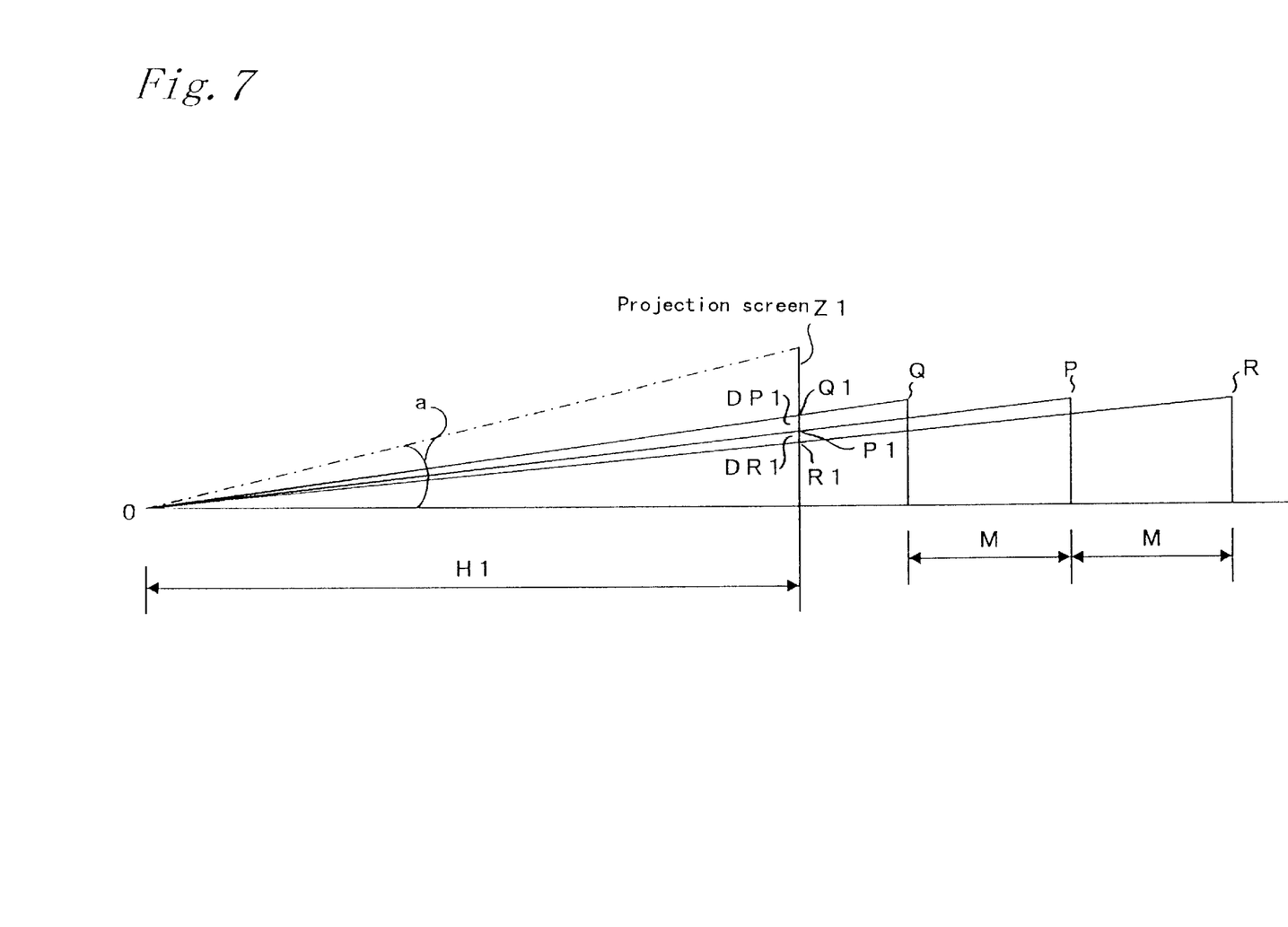
FIG. 7 is a schematic side view showing the relationship among the viewpoint, image display means, and object.

However, in the traditional experience simulation system, the distance H1 from the viewpoint 0 to the projection screen Z1 with the view field angle of a is fixed, as shown in FIG. 7. Because of this, the speed of a moving object is directly reflected on the screen; it can be neither increased nor decreased. A speed higher or lower than that of the moving object, if projected on the screen, would make the player feel more realistic. However, such a technology has not been introduced.

In addition, in a system where this type of perspective conversion technology is used, moving a moving object as well as the viewpoint at a high speed reduces the effective visual area on the projection screen, makes three-dimensional objects difficult to recognize in the three-dimensional space, and decreases the reality of the image produced by the experience simulation system.

It is difficult for human eyes to recognize moving objects which move at higher a speed than, prescribed speed. This also applies when a three-dimensional object is projected on the projection screen. And, the more speedily a three-dimensional object moves within the unit time (T), the more difficult it becomes to recognize the object. In FIG. 7, assume that the two object, the object P and the object R which is more distant from the viewpoint along the z axis but which has the same coordinates X and Y as those of P, have moved toward the viewpoint 0 for the distance of M and that they have reached P and Q respectively. The new positions of the points on the projection screen Z1 are P1, Q1, and R1, and the movement distances of objects P and R are DP1 and DR1. As shown in this figure, although the two objects have moved toward the viewpoint for the same distance along the z axis, the movement distance of the object closer to the viewpoint is larger than that of the object more distant from the viewpoint. And, the object closer to the projection screen is projected in a location closer to the circumference of the projection screen.

This indicates that, even when the amount of movement (M) toward the viewpoint within a specified time (T) (speed of movement toward the viewpoint) is the same, the movement distance on the projection screen (DP1) within the same time (T) of an object located closer to the viewpoint and projected closer to the circumference of the projection screen becomes larger. This makes it more difficult for humans to recognize a moving object located closer to the circumference of the screen. Conversely, the movement distance on the projection screen (DR1) of an object located more distant from the viewpoint and projected smaller on the projection screen is smaller in relation to the amount of movement (M). This makes it less difficult for humans to recognize a moving object even when the object moves faster in relation to the viewpoint and the object moves faster to go the distance M. As a result, the higher movement of an object reduces the effective visual area on the projection screen.

This fact is evidenced by the symptom, called a stricture of a view field (an effective-visual area reduction), we usually experience while driving a car. When we are driving a car at a high speed, the effective visual area is reduced. As a result, we find it difficult to recognize the objects closer to our viewpoint but find it less difficult to recognize distant objects. But, the fact is that, when we are driving a car, we look not only the at objects right in the front but those surrounding them. This makes up the for reduction in the effective visual area, allowing us to view a broad landscape.

In an experience simulation system, the viewpoint is always on a moving object and the projected direction always keeps track of an object that is moving. Thus, the image processing method used in the traditional experience simulation system reduces the visual area as the speed of a moving object increases, because it does not allow the player to look at something surrounding the moving object. It permits the player to recognize only objects in the center of the image display means and therefore degrades the reality of the game when the moving object is moving at high speed.

This invention seeks to solve the problems associated with the prior art described above. It is an object of this invention to provide an experience simulation system which makes a player feel an object moving faster or slower than it actually does at virtual speed. It is another object of this invention to provide an experience simulation system which does not reduce the effective visual area on the projection screen even when a moving object moves fast as well as an image processing method and an image processing system for use with the above-mentioned experience simulation system and other types of image display system.

SUMMARY OF THE INVENTION

To achieve the above object, an image processing method according to this invention is an image processing method which comprises: providing a virtual three-dimensional space containing three-dimensional objects, providing a virtual viewpoint relatively associated with a virtual moving object moving in the virtual three-dimensional space, providing a virtual projection screen on which the objects in the virtual space viewed from the viewpoint are projected, and displaying the two-dimensional projection image of the three-dimensional objects, projected on the projection screen, onto image display means, in which the relative distance between the viewpoint and the projection screen varies according to the movement speed of the virtual moving object.

And, the image processing method comprises: providing a virtual three-dimensional space containing three-dimensional objects, providing a virtual viewpoint relatively associated ith a virtual moving object moving in the virtual three-dimensional space, providing a virtual projection screen on which the objects in the virtual space viewed from the viewpoint are projected, and displaying the two-dimensional projection image of the three-dimensional objects, projected on the projection screen, onto image display means, in which the view field angle of the viewpoint to the projection screen, viewed from the viewpoint, varies according to the movement speed of the virtual moving object and in which the two-dimensional projection image on the projection screen is displayed in a fixed-sized display area on the image display means.

The method according to this invention with the above configuration has the following effects:

(1) The view field angle of the viewpoint to the projection screen may be changed according to the speed of a moving object. For example, when the moving object moves faster, the visual angle to the projection screen becomes large, allowing a larger range of the three-dimensional space to be projected in the same area on the projection screen. As a result, even if the view field is strictured as the moving object moves faster, the view field angle becomes larger and, therefore, a larger range of the three-dimensional space is projected in the same area on the projection screen. This eliminates an extreme reduction in the object that is displayed even if the moving object moves faster.

(2) A larger view field angle results in a smaller projection image on the projection screen or on the display means. This reduces the movement distance of a moving object on the projection screen or on the display means when the moving object approaches another object. As a result, a moving object that moves too fast to be recognized on a projection screen which has a smaller view field angle and on which the movement distance is large could be recognized.

(3) A larger view field angle to the projection screen makes an object look smaller on the projection screen or on the image display means, making the player feel that the object is in the distance. Actually, however, because the distance between the object and the viewpoint is the same and the movement speed of the moving object is constant, the time required for the moving object to reach the object remains unchanged. This makes the player feel as if the distant object was approaching the object in less time speedily.

BRIEF DESCRIPTION OF THE DRAWINGS

FIG. 3 is a diagram showing some examples of images projected on the image display means on a video game system according to this invention. (A) is a diagram showing an image projected when a moving object moves slowly. (B) is a diagram showing an image projected when a moving object moves fast.

DETAILED DESCRIPTION

Referring to the attached drawings, there is shown a preferred embodiment of the present invention.

(1) Configuration of the Embodiment

Figure 1:
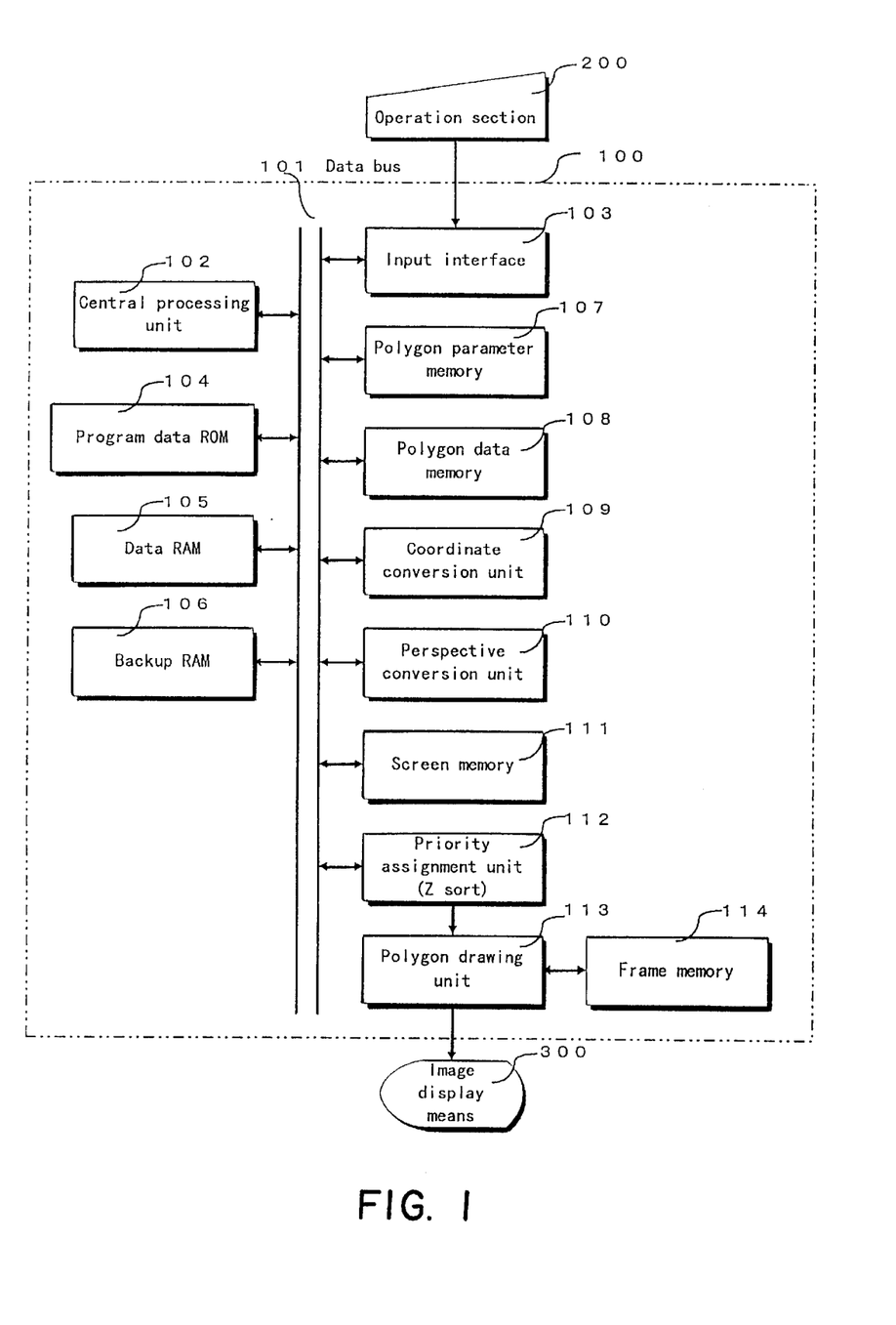
FIG. 1 is a block diagram showing the preferred embodiment of an experience simulation system according to this invention.

Referring to FIG. 1, there is shown an embodiment in which the present invention is used in a video game system.

The experience simulation system in this embodiment comprises the program processing section 100 which includes a computer, operation section 200 which is an input means for the program processing section 100, and image display means 300, such as a CRT, on which output images from the program processing section 100 are displayed.

A unit used for the operation section 200 varies according to the game system. In a home video game system, it is a small control panel such as a control pad or a keyboard; in a game system in a penny arcade, it is a control panel modeled after that in a vehicle used in the game in order to make a player feel more realistic. For example, in a motorcycle game, those control usually provided on a handlebar, such as an accelerator grip and a brake lever, as well as an angle meter are used. In a driving game system, a steering wheel, brake pedal, gear shift, etc., are used. In a flight simulation system, a control stick and a launch switch modeled after those in a cockpit are used. A game player operates the operation section 200 to send to the program processing section 100 the signals necessary for game program execution. Those signals are required to start or end the game, select the contents of the game, and control the direction, speed, and acceleration of the moving object.

The program processing section 100 comprises the central processing unit 102 connected to the data bus 101, the input interface 103 connecting the operation section 200 to the data bus 101, and various memory sections and processing units controlled by the central processing unit 102 via the data bus 101. That is, the system has the program data ROM 104, data RAM 105, and backup RAM 106 that are used by the central processing unit 102 to execute the game program. The program data ROM 104 contains the game program, while the data RAM 105 contains data that is read or written during the execution of the game program. The backup RAM 106 contains data such as program setup data and other information.

Meanwhile, the polygon parameter memory 107 and the polygon data memory 108 are provided to arrange the objects in the virtual three-dimensional space and to represent each object as a polygon. The polygon parameter memory 107 contains the parameters specifying the points in the absolute coordinate system for each object in the virtual three-dimensional space, information on the moving object location sent from the central processing unit 102, information on the viewpoint location, and associated coordinate conversion formulas. The polygon data memory 108 contains polygon data on each object. Each polygon data item is composed of the vertex locations of the polygon and its associated data. The coordinate conversion unit 109 converts the coordinates of the vertexes of each polygon in the three-dimensional space into the viewpoint coordinates (viewpoint-based coordinate system) according to the parameters stored in the parameter memory.

The perspective conversion unit 110 converts polygon data, already converted to the viewpoint coordinates by the coordinate conversion unit 109, into the two-dimensional coordinates on the projection screen some distance away from the view point. This perspective conversion unit 110 uses the following formulas to convert the viewpoint coordinates (X, Y, Z) of each polygon in the three-dimensional space into the coordinates of the vertexes (XS, YS) of the graphic displayed on the projection screen.

$XS=(X/Z) \times h$  [Formula 2]

$YS=(Y/Z) \times h$ $h=H-S/d$  (2)

In the above formula, S is the velocity of the moving object entered from the operation section 200, that is, the movement speed of the three-dimensional object relative to the viewpoint 0 in the viewpoint coordinate system. h is the distance between the viewpoint 0 and the projection screen, H is the base distance between the viewpoint 0 and the projection screen, and d is the change ratio of the focal distance h to the movement speed S.

The screen memory 111 contains two-dimensional projection data, coordinates (XS, YS), on each polygon obtained by the perspective conversion unit 110. The priority assignment unit 112 checks the Z values of a plurality of polygons stored in the screen memory, and sorts the polygons into the ascending order of Z values; that is, the closer to the viewpoint, the higher the priority. Usually, this is called Z sorting. The polygon drawing unit 113 writes the polygons into the frame memory 114 in the order in which they are Z-sorted. Then, the polygon drawing unit 113 reads the polygons from the frame memory 114 and sends them to the image display means 300. The frame memory 114 contains image data, one screenful data at a time, which is sent to the image display means 300 when the image display means 300 draws a polygon.

(2) Operation of the Embodiment

The embodiment with the above configuration operates as follows:

When a player turns the steering wheel or steps on the accelerator, control data entered from the operation section 200 is sent to the central processing unit 102 via the input interface 103 and the data bus 101. The central processing unit 102 executes the game program stored in the program data ROM 104 based on data from the data RAM 105 and the backup RAM 106, and. That is, the central processing unit 102 creates a virtual three-dimensional space based on control data from the operation section 200, reads the game program, and reads parameters from the polygon parameter memory 107. The central processing unit 102 then fetches polygon data from the polygon data memory 108, processes (magnifies, rotates, or moves) it in the virtual three-dimensional space to arrange each object in the three-dimensional space. As the game program proceeds, the central processing unit 102 also stores the parameters, such as moving object positions, viewpoint position, and associated coordinate conversion formulas, into the polygon parameter memory 107. In this case, the position of an moving object moving in the virtual three-dimensional space and polygon data on each object are represented using the absolute coordinate system with a particular point in the virtual three-dimensional space as its origin.

The coordinate conversion unit 109 reads polygon data on each three-dimensional object from the polygon data memory 108 and reads data on the position of a moving object and the viewpoint as well as the associated coordinate formulas from the polygon parameter memory 107. The coordinate conversion unit 109 then converts polygon coordinate data from the absolute coordinate system in the virtual three-dimensional space into the viewpoint coordinate system, based on the viewpoint which is fixed relative to the moving object.

The perspective conversion unit 110 projects polygon coordinate data, represented in the viewpoint coordinate system, onto the projection screen some distance away from the viewpoint. In this embodiment, the distance h from the projection screen to the viewpoint 0 is determined using the formulas (2) with the speed of the moving object entered from the operation section 200 as the parameter. More specifically, when the player operates the game machine, for example, by turning on the accelerator, the speed data S on the moving object is sent from the operation section 200 to the perspective conversion unit 110. The base distance H and the change ratio d of the distance h to the movement speed, which are determined by the program, stored in the program data ROM 104.

The perspective conversion unit 110 generates two-dimensional data of each polygon on the projection screen as described above and stores it in the screen memory 111. Then, the priority assignment unit 112 references polygon data stored in the screen memory 111 to check the Z value, and performs Z sorting on polygon data to arrange a plurality of polygon data items in the ascending order with respect to the viewpoint 0. The polygon drawing unit 113 writes Z-sorted polygon data into the frame memory 114 in the priority order. The frame memory 114 contains image data, one screenful data of the image display means 300 at a time, and outputs it when the image display means 300 draws it.

(3) Effects of the Embodiment

Figure 2:
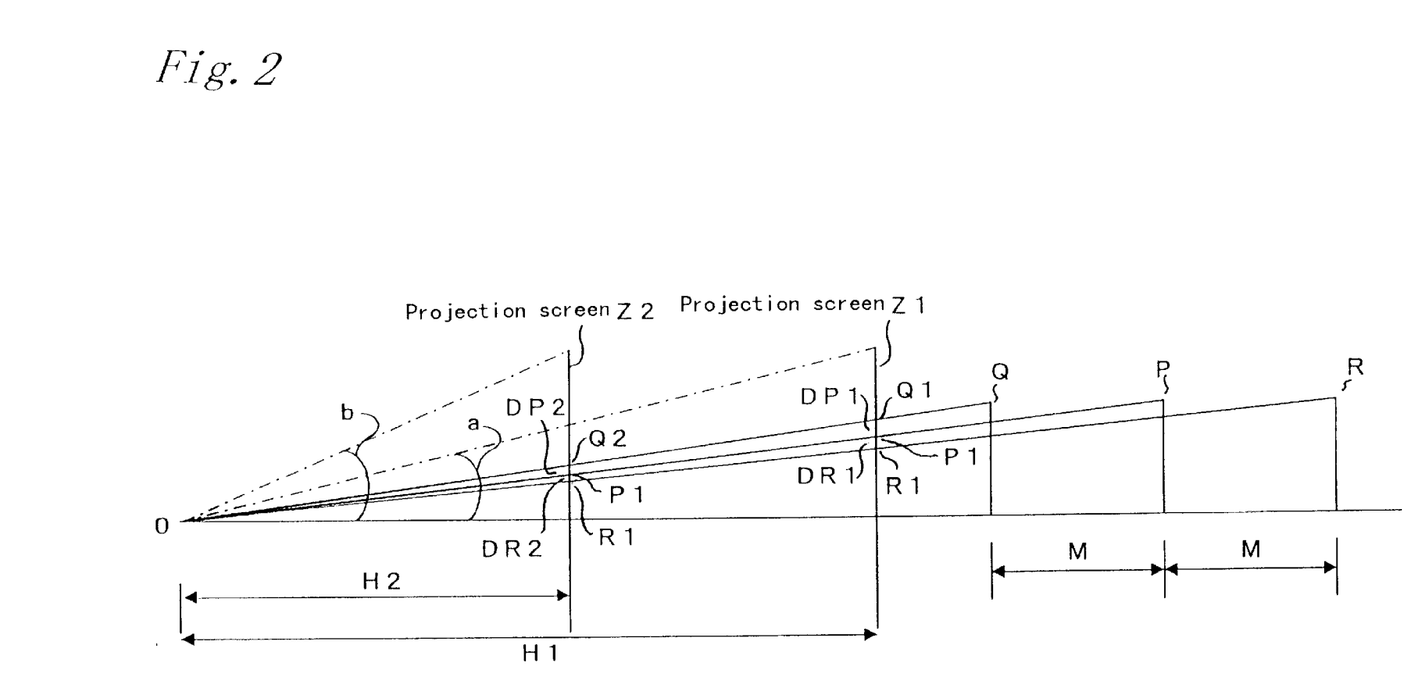
FIG. 2 is a schematic side view of the embodiment in FIG. 1, illustrating the relationship among the viewpoint, projection screen, and object.

For an object that moves fast, as shown in FIG. 2, the experience simulation system with the above configuration projects the object in the virtual three-dimensional space onto the projection screen Z2 which is set closer to the viewpoint than the projection screen Z1 onto which the system projects an object that moves slowly. In FIG. 2, assume that the two objects, the object P and the object R which is more distant from the viewpoint along the z axis but which has the same coordinates X and Y as those of P, have moved toward the viewpoint 0 for the distance of M and that they have reached P and Q respectively. The new positions of the points on the projection screen Z2 are P2, Q2, and R2, and the movement distances of the objects P and R are DP2 and DR2. Comparing the movement distances DP2 and DR2 on the projection screen Z2 which is closer to the viewpoint with the movement distances DP1 and DR1 on the projection screen Z1 which is more distant from the viewpoint shows that the movement distances DP2 and DR2 are smaller than DP1 and DR1. This means that, even in a situation where an object moves too fast for the player to recognize the movement distance DP1 on the projection screen Z1, the player can recognize the movement distance on the projection screen Z2 because the distance is short.

That is, the shorter the distance to the projection screen and the smaller the object on the projection screen, the smaller the movement amount per unit time. This enables our eyes to recognize a larger movement distance on the projection screen per unit time. This means that, when the projection screen is distant from the view point, an object whose movement distance per unit time is large (the movement speed is high) and who is out of the effective visual area can go into the effective visual area when the projection screen is closer to the viewpoint. Although the ineffective visual area becomes large as the projection screen is closer to the viewpoint, the player can recognize an object that moves a longer distance in the three-dimensional space.

In the meanwhile, changing the projection screen from Z1 to Z2 changes the points P1, Q1, and R1 to P2, Q2, and R2 respectively, as shown in FIG. 2, while the distance between the viewpoint and the object P remains the same. As a result, the range of the virtual three-dimensional space projected on the projection screen Z2 becomes large, but each object in the space becomes smaller when projected. This makes the effective visual area on the projection screen Z2 smaller than that on the projection screen Z1. That is, the surrounding image becomes more difficult to recognize on the projection screen Z2 and, therefore, the surrounding landscape is displayed as if it was flowing, making the player feel the object moving faster. Thus, although this embodiment makes the effective visual area smaller and makes the player feel the object moving faster, it projects a larger three-dimensional virtual space in a smaller effective visual area. This makes the player feel the object moving faster by a stricture of a visual field and makes the game more realistic.

Figure 3A:
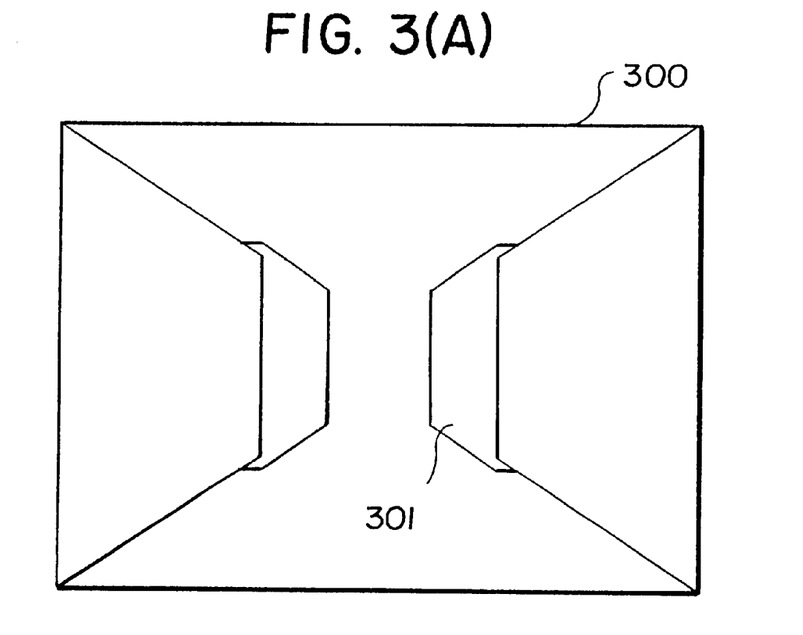
Figure 3B:
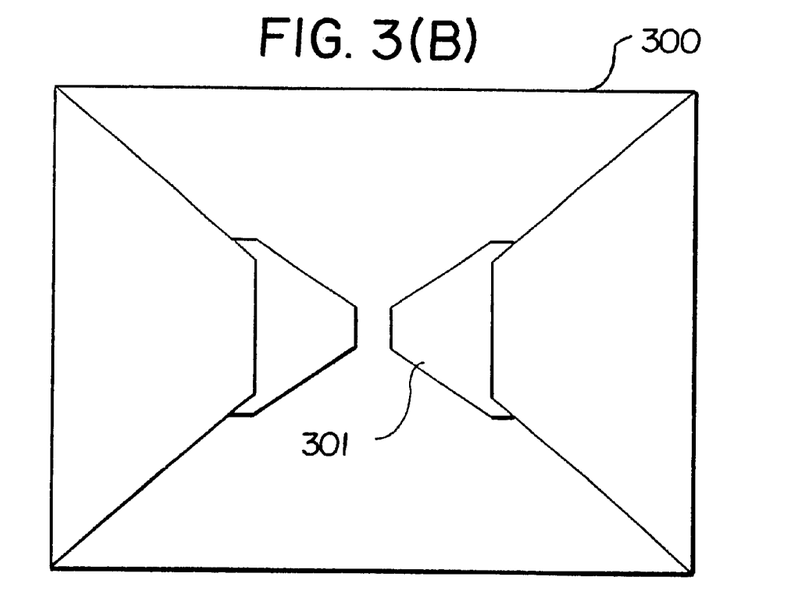

In this embodiment, because the visual angle 'a' to the projection screen is large, a larger part of the object 301 is displayed on the projection screen (B) which has a large visual angle than on the projection screen (A) which has a smaller visual angle, as shown in FIG. 3. In addition, even if the distance between the viewpoint and the object 301 remain the same, a larger visual angle 'a' makes the object 301 look smaller on the projection screen (B) which has a larger visual angle than on the projection screen (A) which has a smaller visual angle. This makes the player feel as if the object was in the distance. However, because it takes less time for a fast-moving object to reach the object 301, the player feels as if the moving object was approaching the distant object more speedily. This change in the visual angle occurs while the moving object is moving in the three-dimensional space. Therefore, the player cannot distinguish between a change in the image that occurs when the moving object is approaching another object and a change in the image that is caused by the visual angle, thus making the player feel the speed increased more naturally.

(4) Other Embodiments

Figure 4:
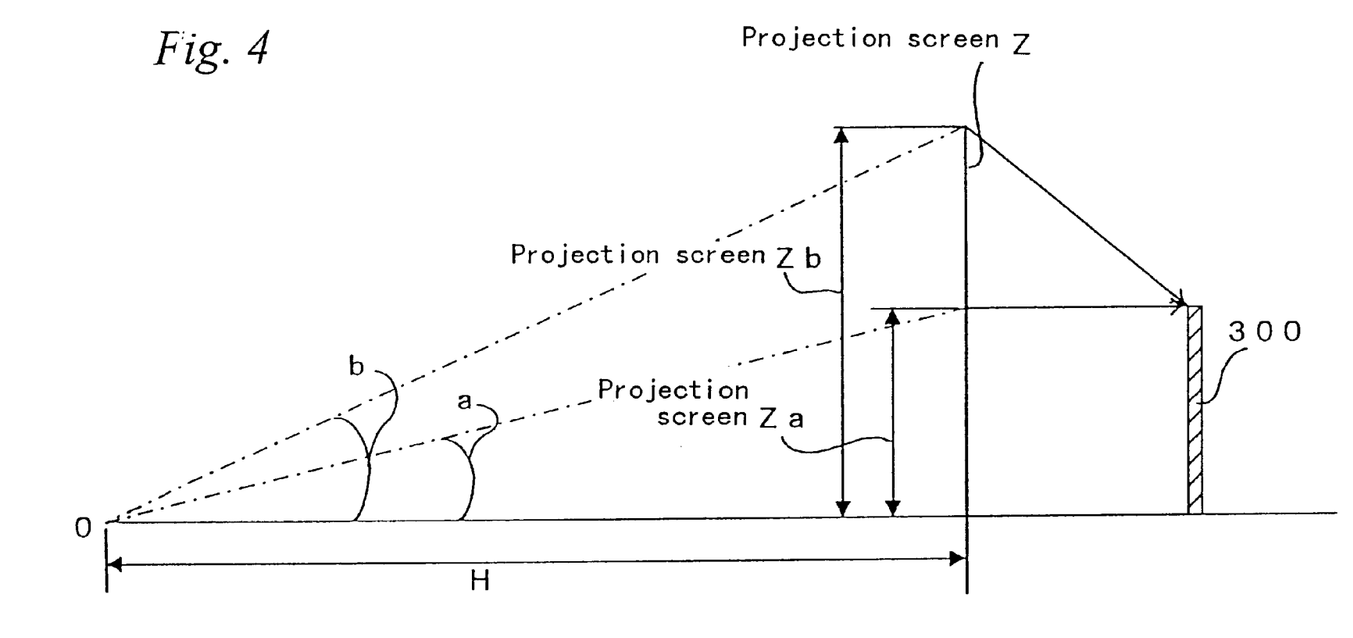
FIG. 4 is a schematic side view of another embodiment according to this invention, illustrating the relationship among the viewpoint, projection screen, and object.

The invention may be embodied in other specific forms without departing from the spirit or essential characteristics thereof The invention includes an embodiment, such as the one shown in FIG. 4, in which the distance between the viewpoint 0 and the projection screen Z is constant and the visual angle to the projection screen variable. In FIG. 4, when a moving object moves slowly, a virtual three-dimensional space is projected on the projection screen Za, which has a small visual angle. It is then displayed on the image display means 300. When a moving object moves fast, a virtual three-dimensional space is projected on a projection screen Zb which is located in the same position as the projection screen Za but has a larger visual angle 'b'. The projected image data is then reduced and is drawn within the same display area on the image display means 300 as that used for a slow moving object. As the moving object moves faster, this method makes the range of the virtual three-dimensional space displayed on the image display means larger and the projected image of each object in the virtual three-dimensional space smaller, giving the same effect as that it gives when the distance from the viewpoint to the projection screen is changed.

INDUSTRIAL APPLICABILITY

As described above, this invention combines the speed of the image of a moving object with an additional speed caused by a change in the visual angle to the projection screen, making the player feel the object moving faster or more slowly than it actually does at the virtual speed and making the game more realistic.

What is claimed is:

1. An image processing method which comprises: providing a virtual three-dimensional space containing three-dimensional objects, providing a virtual viewpoint relatively associated with a virtual moving object moving in said virtual three-dimensional space, wherein the position of said viewpoint varies according to movement speed of said virtual moving object, providing a virtual projection screen an which the objects in said virtual space viewed from said viewpoint are projected, and displaying the two-dimensional projection image of said three-dimensional objects, projected on said projection screen, onto image display means, in which the relative distance between said viewpoint and said projection screen varies according to the movement speed of the virtual moving object so that when the virtual moving object moves faster, the view field angle to the projection screen becomes larger, allowing a larger range of the virtual three-dimensional space to be projected in the same area on the projection screen.

2. An image processing method which comprises: providing a virtual three-dimensional space containing three-dimensional objects, providing a virtual viewpoint relatively associated with a virtual moving object moving in said virtual three-dimensional space, wherein the position of said viewpoint varies according to movement speed of said virtual moving object so that when the virtual moving object moves faster, the view field angle to the projection screen becomes larger, allowing a larger range of the virtual three-dimensional space to be projected in the same area on the projection screen, providing a virtual projection screen on which the objects in said virtual space viewed from said viewpoint are projected, and displaying the two-dimensional projection image of said three-dimensional objects, projected on said projection screen, onto image display means, in which the view field angle of said viewpoint to the projection screen varies according to the movement speed of said virtual moving object and in which the two-dimensional projection image on the projection screen is displayed in a fixed-sized display area on the image display means.

3. An image processing method as claimed in claim 1, wherein each of said three-dimensional objects is composed of a plurality of polygons and, when converting the polygon vertex coordinates (X, Y, Z) in the viewpoint coordinate system, based on said viewpoint, into the two-dimensional projection image coordinates (XS, YS) in the coordinate system on the projection screen h distant from said viewpoint, the coordinates (XS, YS) of said two-dimensional projection image are obtained using the formulas given below where S is the movement speed of said moving object, h is the distance between the viewpoint and the projection screen, H is the base distance between the viewpoint set up for a given movement speed S and the projection screen, and d is a change ratio of the distance h to the movement speed S:

$$XS=(X/Z) \times h$$
$$YS=(Y/Z) \times h$$
$$h=H-S/d.$$

4. An image processing system comprising:
a coordinate conversion unit providing a virtual three-dimensional space containing three-dimensional objects and providing a viewpoint coordinate system based on a viewpoint relatively associated with a virtual moving object moving in the virtual three-dimensional space, wherein the position of said viewpoint varies according to movement speed of said virtual moving object so that when the virtual moving object moves faster, the view field angle to the projection screen becomes larger, allowing a larger range of the virtual three-dimensional space to be projected in the same area on the projection screen; and
a perspective conversion unit outputting the two-dimensional projection image of said object on image display means based on the distance between the viewpoint and the projection screen and the coordinates output from said coordinate conversion unit, in which said perspective conversion unit varies the distance between said viewpoint and the projection screen according to the movement speed of said virtual moving object.

5. An image processing system comprising:
a coordinate conversion unit providing a virtual three-dimensional space containing three-dimensional objects and providing a viewpoint coordinate system based on a viewpoint relatively associated with a virtual moving object moving in the virtual three-dimensional space, wherein the position of said viewpoint varies according to movement speed of said virtual moving object so that when the virtual moving object moves faster, the view field angle to the projection screen becomes larger, allowing a larger range of the virtual three-dimensional space to be projected in the same area on the projection screen; and
a perspective conversion unit outputting the two-dimensional projection image of said object on image display means based on the distance between the viewpoint and the projection screen and the coordinates output from said coordinate conversion unit, in which said perspective conversion unit varies the view field angle of said viewpoint to the projection screen according to the movement speed of said virtual moving object and displays the two-dimensional projection image in a fixed-size display area on the image display means.

6. An experience simulation system comprising:
a program processing unit executing a program causing a moving object to move in a virtual three-dimensional space containing three-dimensional objects;
an operation section sending information on the movement speed of the moving object in the virtual three-dimensional space to said program processing unit; and
image display means on which a two-dimensional projection image converted from said three-dimensional objects created by said program processing unit is displayed,
said program processing unit comprising:
a central processing unit;
a plurality of memories;
a coordinate conversion unit generating a viewpoint coordinate system based on a viewpoint relatively associated with the virtual moving object moving in said virtual three-dimensional space, wherein the position of said viewpoint varies according to movement speed of said virtual moving object so that when the virtual moving object moves faster, the view field angle to the projection screen becomes larger, allowing a larger range of the virtual three-dimensional space to be projected in the same area on the projection screen; and
a perspective conversion unit outputting to the projection screen the two-dimensional projection image of said object based on the distance between said viewpoint and a projection screen some distance from the viewpoint and the coordinates output from said coordinate conversion unit, in which said operation section sends information on the movement speed of the moving object determining the distance between said viewpoint and the projection screen to said perspective conversion unit and,
in which said perspective conversion unit varies the distance between said viewpoint and the projection screen according to the movement speed of said virtual moving object entered from said operation section.

7. An experience simulation system comprising:
a program processing unit executing a program causing a moving object to move in a virtual three-dimensional space containing three-dimensional objects;

an operation section sending information on the movement speed of the moving object in the virtual three-dimensional space to said program processing unit; and image display means on which a two-dimensional projection image converted from said three-dimensional object created by said program processing unit is displayed, said program processing unit comprising:
- a central processing unit;
- a plurality of memories;
- a coordinate conversion unit generating a viewpoint coordinate system based on a viewpoint relatively associated with the virtual moving object moving in said virtual three-dimensional space, wherein the position of said viewpoint varies according to movement speed of said virtual moving object so that when the virtual moving object moves faster, the view field angle to the projection screen becomes larger, allowing a larger range of the virtual three-dimensional space to be projected in the same area on the projection screen; and
- a perspective conversion unit outputting to the projection screen the two-dimensional projection image of said object based on the distance between said viewpoint and a projection screen some distance from the viewpoint and the coordinates output from said coordinate conversion unit, in which said operation section sends information on the movement speed of the moving object determining the distance between said viewpoint and the projection screen to said perspective conversion unit, and
- in which said perspective conversion unit varies the visual angle of said viewpoint to the projection screen according to the movement speed of said virtual moving object entered from said operation section and displays a two-dimensional projection image projected on the projection screen in a fixed-size area on the image display means.

8. An experience simulation system as claimed in claim 6, wherein said program processing unit comprises:
- a memory containing a game program;
- a polygon data memory containing data on a plurality of polygons constituting a three-dimensional object;
- a polygon parameter memory containing parameters to be used by the central processing unit to process said polygon data and to arrange said three-dimensional objects in said virtual three-dimensional space, and
- a coordinate conversion unit converting the polygon data of the three-dimensional objects arranged in said virtual three-dimensional space into the viewpoint coordinate system based on the viewpoint; in which said perspective conversion unit outputs to the display screen on the image display means the two-dimensional projection image of said objects based on the distance between the viewpoint and the projection screen and the coordinates output from said coordinate conversion unit.

9. An experience simulation system as claimed in claim 6, wherein, when said perspective conversion unit converts the vertex coordinates (X, Y, Z) of each polygon in said viewpoint coordinate system into the vertex coordinates (XS, YS) of a two-dimensional image to be drawn on the projection screen h distant from said viewpoint, the vertex coordinates (XS, YS) of said two-dimensional image are calculated using $$XS=(X/Z) \times h$$
$$YS=(Y/Z) \times h$$
$$h=H-S/d$$

where S is the movement speed of the moving object, h is the distance between the viewpoint and the projection screen, H is the base distance between the viewpoint and the projection screen set up for a given movement speed S, and d is the change ratio of the distance h to the movement speed S.

10. An image processing method which comprises:
- providing a virtual three-dimensional space containing three-dimensional objects, providing a virtual viewpoint relatively associated with a virtual moving object moving in said virtual three-dimensional space, wherein the position of said viewpoint varies according to movement speed of said virtual moving object so that when the virtual moving object moves faster, the view field angle to the projection screen becomes larger, allowing a larger range of the virtual three-dimensional space to be projected in the same area on the projection screen;
- providing a virtual projection screen on which the objects in said virtual space viewed from said viewpoint are projected;
- displaying the two-dimensional projection image of said three-dimensional objects, projected on said projection screen, onto image display means; and
- varying the view field angle of said viewpoint to the projection screen according to the movement speed of said virtual moving object in order to increase or decrease the projected range of said virtual three-dimensional space projected on said projection screen while the complete two-dimensional projection image projected on the projection screen is displayed in focus on a fixed-sized area on the image display means.

11. An image processing system comprising:
- a coordinate conversion unit providing a virtual three-dimensional space containing three-dimensional objects and providing a virtual viewpoint coordinate system based on a viewpoint relatively associated with a virtual moving object moving in the virtual three-dimensional space, wherein the position of said viewpoint varies according to movement speed of said virtual moving object so that when the virtual moving object moves faster, the view field angle to the projection screen becomes larger, allowing a larger range of the virtual three-dimensional space to be projected in the same area on the projection screen; and
- a perspective conversion unit means for outputting the two-dimensional projection image of said object on an image display means based on the distance between the viewpoint and the projection screen and the coordinates output from said coordinate conversion unit;
- in which said perspective conversion unit means varies the view field angle of said viewpoint to the projection screen according to the movement speed of said virtual moving object to increase or decrease the projected range of said virtual three-dimensional space to be projected on said projection screen and then displays in focus a two-dimensional projection image projected on the projection screen in a fixed size area on the image display means.

12. A computer-readable storage medium containing a program for executing an image processing method which comprises:
- means for providing a virtual three-dimensional space containing three-dimensional objects;

means for providing a virtual viewpoint relatively associated with virtual moving object moving in said virtual three-dimensional space; wherein the position of said viewpoint varies according to movement speed of said virtual moving object so that when the virtual moving object moves faster, the view field angle to the projection screen becomes larger, allowing a larger range of the virtual three-dimensional space to be projected in the same area on the projection screen;

providing a virtual projection screen on which the objects in said virtual space viewed from said viewpoint are projected;

means for displaying the two-dimensional projection image of said three-dimensional objects, projected on said projection screen, onto image display means; and means for varying the relative distance between said viewpoint and said projection screen according to the movement speed of said virtual moving object.

13. A computer-readable storage medium containing a program for executing an image processing method which comprises:

providing a virtual three-dimensional space containing three-dimensional objects;

providing a virtual viewpoint relatively associated with a virtual moving object moving in said three-dimensional space, wherein the position of said viewpoint varies according to movement speed of said virtual moving object so that when the virtual moving object moves faster, the view field angle to the projection screen becomes larger, allowing a larger range of the virtual three-dimensional space to be projected in the same area on the projection screen;

providing a virtual projection screen on which the objects in said virtual space viewed from said viewpoint are projected;

displaying the two-dimensional projection image of said three-dimensional objects, projected on said projection screen, onto an image display means, varying the view field angle of said viewpoint to the projection screen according to the movement speed of said virtual moving object to increase or decrease the projected range of said virtual three-dimensional space projected on said projection screen and displaying the two-dimensional projection image projected on the projection screen in a fixed-size area on the image display means.

14. An image processing method as claimed in claim 2, wherein each of said three-dimensional objects is composed of a plurality of polygons and, when converting the polygon vertex coordinates (X, Y, Z) in the viewpoint coordinate system based on said viewpoint, into the two-dimensional projection image coordinates (XS, YS) in the coordinate system on the projection screen h distant from said viewpoint, the coordinates (XS, YS) of said two-dimensional projection image are obtained using the formulas given below where S is the movement speed of said moving object, h is the distance between the viewpoint and the projection screen, H is the base distance between the viewpoint set up for a given movement speed S and the projection screen, and d is a change ratio of the distance h to the movement speed S:

$XS=(X/Z) \times h$ $YS=(Y/Z) \times h$ $h=H-S/d.$

15. An experience simulation system as claimed in claim 7, wherein said program processing unit comprises:

a memory containing a game program;

polygon data on a plurality of polygons constituting a three-dimensional object;

a polygon parameter memory containing parameters to be used by the central processing unit to process said polygon data and to arrange said three-dimensional objects in said virtual three-dimensional space, and a coordinate conversion unit converting the polygon data of the three-dimensional objects arranged in said virtual three-dimensional space into the viewpoint coordinate system based on the viewpoint, in which said perspective conversion unit outputs to the display screen on the image display means the two-dimensional projection image of said objects based on the distance between the viewpoint and the projection screen and the coordinates output from said coordinate conversion unit.

16. A computer implemented method for projecting images on a display unit in an image processing system comprising:

a) creating a virtual three-dimensional space containing three-dimensional objects with a central processing unit of said system;

b) generating a virtual viewpoint associated relatively with a virtual moving object moving in said virtual three-dimensional space, wherein the position of said viewpoint varies according to movement speed of said virtual moving object;

c) providing a virtual projection screen on which the objects in said virtual space viewed from said viewpoint are projected;

d) displaying the two-dimensional projection image of said three-dimensional objects, projected on said virtual projection screen, onto said display unit, in which the relative distance between said viewpoint and said projection screen varies according to the movement speed of said virtual moving object;

e) varying the view field angle of said viewpoint to the projection screen according to the movement speed of said virtual moving object in order to increase or decrease the projected range of said virtual three-dimensional space projected on said projection screen while the complete two-dimensional projection image projected on the projection screen is displayed in focus on a fixed-sized area on said display unit; and, f) each of said three-dimensional objects includes a plurality of polygons and, when converting polygon vertex coordinates (X, Y, Z) in the viewpoint coordinate system based on said viewpoint, into the two-dimensional projection image coordinates (XS, YS) in the coordinate system on the projection screen h distant from said viewpoint, the coordinates (XS, YS) of said two-dimensional projection image are obtained using the formulas given below where S is the movement speed of said moving object, h is the distance between the viewpoint and the projection screen, H is the base distance between the viewpoint set up for a given movement speed S and the projection screen, and d is a change ratio of the distance h to the movement speed S:

$XS=(X/Z) \times h$ $YS=(Y/Z) \times h$ $h=H-S/d.$

* * * * *